United States Patent
Yeke Yazdandoost et al.

(10) Patent No.: US 10,474,860 B2
(45) Date of Patent: Nov. 12, 2019

(54) ELECTRONIC DEVICE INCLUDING A DISPLAY DRIVEN BASED UPON FIRST AND SECOND ALTERNATINGLY READ MEMORIES AND RELATED METHODS

(71) Applicant: Apple Inc., Cupertino, CA (US)

(72) Inventors: Mohammad Yeke Yazdandoost, San Jose, CA (US); Yafei Bi, Los Altos Hills, CA (US); Kingsuk Brahma, Mountain View, CA (US); Giovanni Gozzini, Berkeley, CA (US); Mohammad Jangda, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 47 days.

(21) Appl. No.: 15/720,827

(22) Filed: Sep. 29, 2017

(65) Prior Publication Data
US 2019/0102599 A1    Apr. 4, 2019

(51) Int. Cl.
G06K 9/00 (2006.01)
G06K 17/00 (2006.01)
G06K 19/077 (2006.01)
G06K 9/20 (2006.01)

(52) U.S. Cl.
CPC ....... *G06K 9/00013* (2013.01); *G06K 9/0004* (2013.01); *G06K 9/2027* (2013.01); *G06K 17/0022* (2013.01); *G06K 19/07705* (2013.01); *G06K 19/07732* (2013.01)

(58) Field of Classification Search
CPC ............ G06K 9/00013; G06K 9/00006; A61B 5/1172
See application file for complete search history.

(56) References Cited

U.S. PATENT DOCUMENTS

| | | | |
|---|---|---|---|
| 2005/0089203 A1* | 4/2005 | Setlak | G06K 9/00013 382/124 |
| 2011/0199338 A1* | 8/2011 | Kim | G06F 3/0418 345/175 |
| 2015/0109214 A1* | 4/2015 | Shi | G06F 3/044 345/173 |
| 2015/0254491 A1* | 9/2015 | Mo | G06F 3/0416 345/174 |
| 2016/0027146 A1* | 1/2016 | Kim | H04N 19/44 345/629 |
| 2016/0110025 A1* | 4/2016 | Hossu | G06F 3/0412 382/124 |
| 2017/0364763 A1* | 12/2017 | Jin | G06K 9/0002 |
| 2018/0005006 A1* | 1/2018 | Chai | G06K 9/0004 |
| 2018/0005007 A1* | 1/2018 | Du | H01L 27/3262 |
| 2018/0196931 A1* | 7/2018 | Cho | G06F 21/32 |
| 2018/0204040 A1* | 7/2018 | Kwon | G06F 1/1626 |
| 2018/0269240 A1* | 9/2018 | Mainguet | G06K 9/2054 |
| 2018/0285619 A1* | 10/2018 | Kim | G06K 9/00013 |

* cited by examiner

*Primary Examiner* — Rebecca A Volentine
(74) *Attorney, Agent, or Firm* — Allen, Dyer, Doppelt + Gilchrist, P.A.

(57) ABSTRACT

An electronic device may include a display and a biometric image sensor configured for biometric image sensing. The electronic device may also include a display driver coupled to the display. The display driver may include first and second memories and a processor configured to alternatingly read respective illumination pattern data from the first and second memories to drive the display during biometric image sensing.

24 Claims, 5 Drawing Sheets

ELECTRONIC DEVICE INCLUDING A DISPLAY DRIVEN BASED UPON FIRST AND SECOND ALTERNATINGLY READ MEMORIES AND RELATED METHODS

TECHNICAL FIELD

The present invention relates to the field of electronics, and, more particularly, to the field of optical images sensors and related methods.

BACKGROUND

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A fingerprint sensor may be particularly advantageous for verification and/or authentication in an electronic device, and more particularly, a portable device, for example. Such a fingerprint sensor may be carried by the housing of a portable electronic device, for example, and may be sized to sense a fingerprint from a single-finger.

Where a fingerprint sensor is integrated into an electronic device or host device, for example, as noted above, it may be desirable to more quickly perform authentication. Authentication may be delayed by other tasks or applications being performed on the electronic device, or by electronic device background processes.

SUMMARY

An electronic device may include a display and a biometric image sensor configured for biometric image sensing. The electronic device may also include a display driver coupled to the display. The display driver may include first and second memories, and a processor configured to alternatingly read respective illumination pattern data from the first and second memories to drive the display during biometric image sensing.

The electronic device may also include a device processor communicating the illumination pattern data to the display driver. The processor and the device processor may be implemented as separate integrated circuits (ICs), for example.

The device processor may be configured to write the respective illumination pattern data to the second memory while the processor drives the display based upon the respective illumination pattern data from the first memory, and write the respective illumination pattern data to the first memory while the processor drives the display based upon the respective illumination pattern data from the second memory, for example.

The device processor may be configured to alternatingly write the respective illumination pattern data to the first and second memories while the processor alternatingly reads the respective illumination pattern data from another of the first and second memories. The biometric image sensor may be configured to communicate the illumination pattern data to the display driver. The display may define a finger placement surface, for example.

The display may include a light emitting diode (LED) display. The LED display may include an organic LED display, for example. The first and second memories each may include static random access memory (SRAM), for example.

A method aspect is directed to a method of operating an electronic device that includes a display, a biometric image sensor configured for biometric image sensing, and a display driver coupled to the display. The method may include using a processor of the display driver to alternatingly read respective illumination pattern data from first and second memories of the display driver to drive the display during biometric image sensing.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation is used to indicate similar elements in alternative embodiments.

Figure 2:
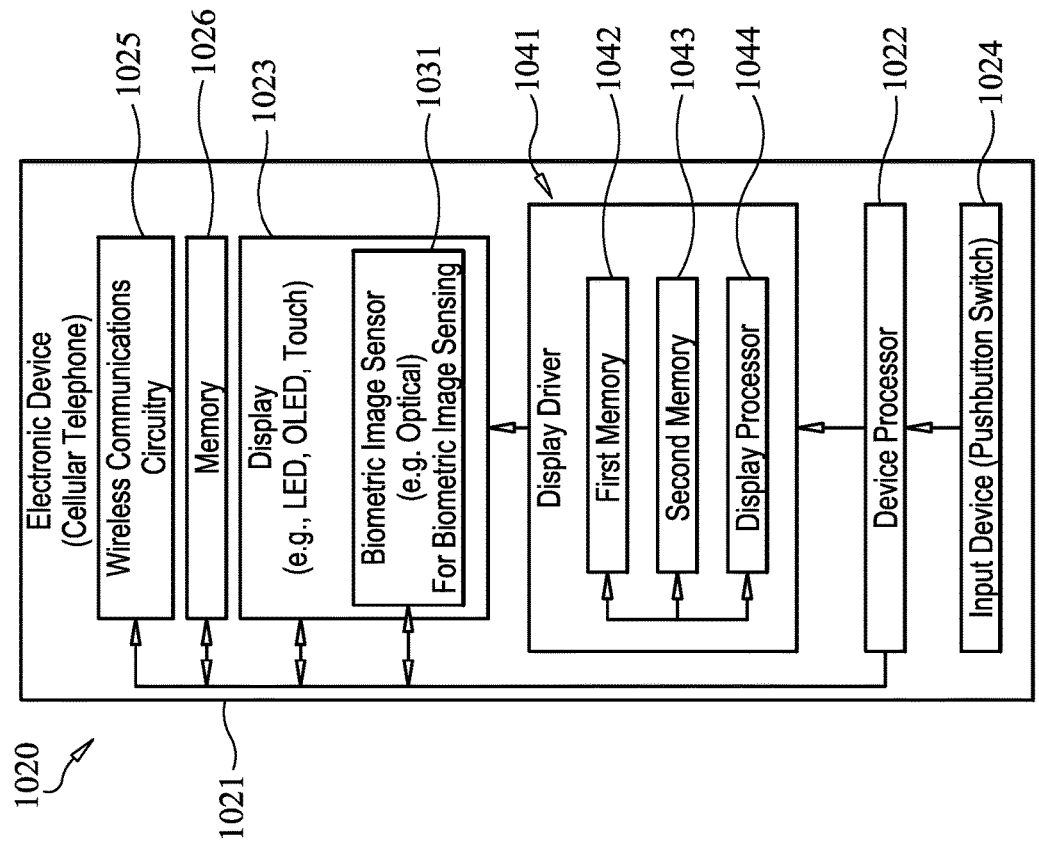
FIG. 2 is a schematic block diagram of an electronic device of FIG. 1.
Figure 1:
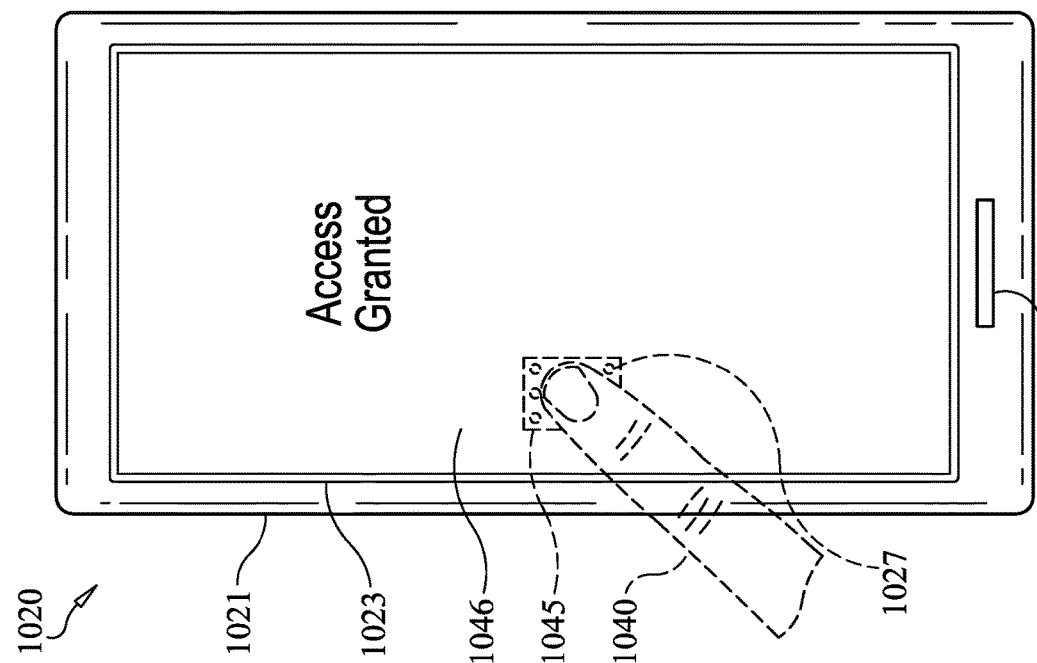
FIG. 1 is a plan view of an electronic device according to an embodiment.
Figure 3:
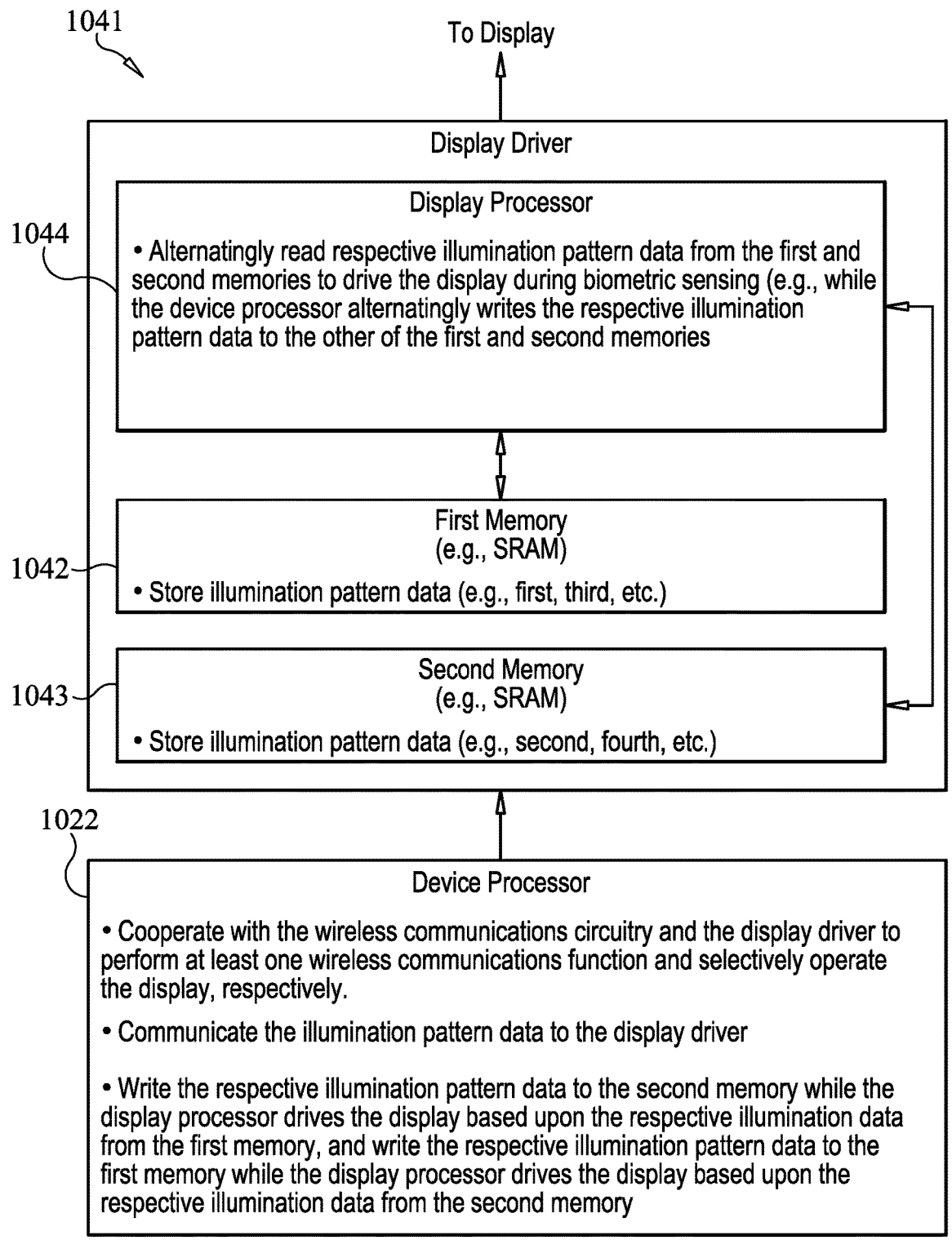
FIG. 3 is a more detailed schematic block diagram of the display driver and device processor of the electronic device of FIG. 2.

Referring initially to FIGS. 1 and 2, an electronic device 1020 illustratively includes a housing, for example, a portable housing 1021, and a device processor 1022 carried by the portable housing. The device processor 1022 may be implemented as in integrated circuit (IC), for example. The electronic device 1020 is illustratively a mobile wireless communications device, for example, a cellular telephone. The electronic device 1020 may be another type of electronic device, for example, a tablet computer, laptop computer, wearable computer, etc.

A display 1023 is also carried by the portable housing 1021 and is coupled to the processor 1022. The display 1023 may be a light emitting diode (LED) display including LEDs 1027, for example, and more particularly, an organic LED (OLED) display. The display 1023 may have additional circuitry to provide touch display features, as will be appreciated by those skilled in the art.

Wireless communications circuitry 1025, for example, a wireless transceiver, is also carried within the housing 1021 and coupled to the device processor 1022. The wireless communications circuitry 1025 cooperates with the processor 1022 to perform at least one wireless communications function, for example, for voice and/or data. In some embodiments, the electronic device 1020 may not include a wireless communications circuitry 1025.

A memory 1026 is also coupled to the device processor 1022. The memory 1026 is for storing finger matching biometric template data, for example. The memory 1026 may store other or additional types of data. The memory 1026 may be integrated with other components or a stand-alone memory.

The electronic device 1020 also includes a biometric image sensor 1031 for biometric image sensing, for example, for sensing a biometric image of fingerprint patterns of a user's finger 1040 when adjacent a finger placement surface 1046 defined by the display 1023 (e.g., an upper surface of the display). The biometric image sensor 1031 may be an optical image sensor and may be carried by the housing 1021 under the display 1023. The biometric image sensor 1031 may cooperate with the device processor 1022 to perform an authentication function, for example, by matching acquired biometric image data to enrolled biometric imaged data.

With reference again to the display 1023 and as will be appreciated by those skilled in the art, if the display 1023 is in the form of a touch display, the touch display may operate as both an input device and a display. As such, the display 1023 would cooperate with the processor 1022 to perform one or more device functions in response to input. For example, a device function may include a powering on or off of the electronic device 1020, initiating communication via the wireless communications circuitry 1025, and/or performing a menu function based upon input to the touch display.

The device processor 1022 may change the display 1023 to show a menu of available applications based upon pressing or input to the touch display. Of course, other device functions may be performed based upon input to the touch display 1023. Other or additional finger-operated user input devices may be carried by the portable housing 1021, for example, a pushbutton switch 1024, which may alternatively or additionally be used for device functions as will be appreciated by those skilled in the art.

Operation of the display 1023, for example, the selective operation of individual pixels or LEDs 1027 of the display, is controlled by a display driver 1041. The display driver 1041 may alternately or additionally control or selectively operate one or more LEDs or light sources that are not pixels of the display, but may be considered part of the display 1023.

The display driver 1041 includes circuitry, for example, a display processor 1044 and first and second memories 1042, 1043. The display driver 1041 may be in the form of an IC, for example, and separate from the device processor 1022. That is, the display processor 1044 and the first and second memories 1042, 1043 may be carried by an IC substrate. The display driver 1041 may be upstream from and/or isolated from the device processor 1022, for example, for increased security. The display processor 1044 alternatingly reads respective illumination pattern data from the first and second memories 1042, 1043 to drive the display 1023 during biometric image sensing. The respective illumination pattern data provides instructions to the display processor 1044 as to which LEDs 1027 (i.e., which selected ones) to drive. For example, an illumination pattern may include driving perimeter. LEDs, and/or driving LEDs sequentially, in a checkerboard pattern, alternating rows, columns, etc. In some embodiments, the display driver 1041 may drive or selectively illuminate pixels that sense a pressure, for example, being indicative of an adjacent finger or object. Of course, the display processor 1044 may drive the display 1023 to have any type of illumination pattern.

Figure 4:
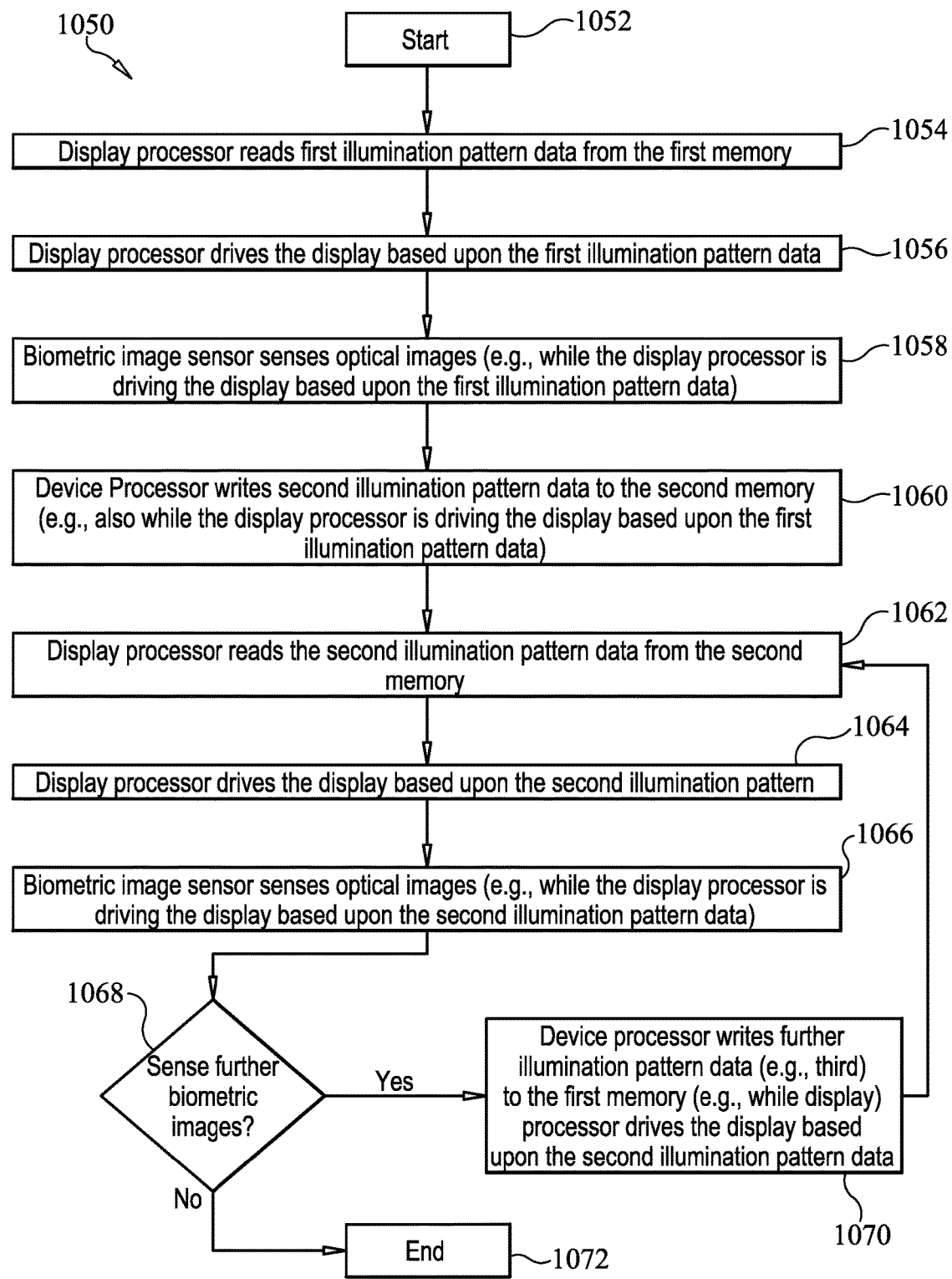
FIG. 4 is a flow diagram of operation of the electronic device according to an embodiment.
Figure 5:
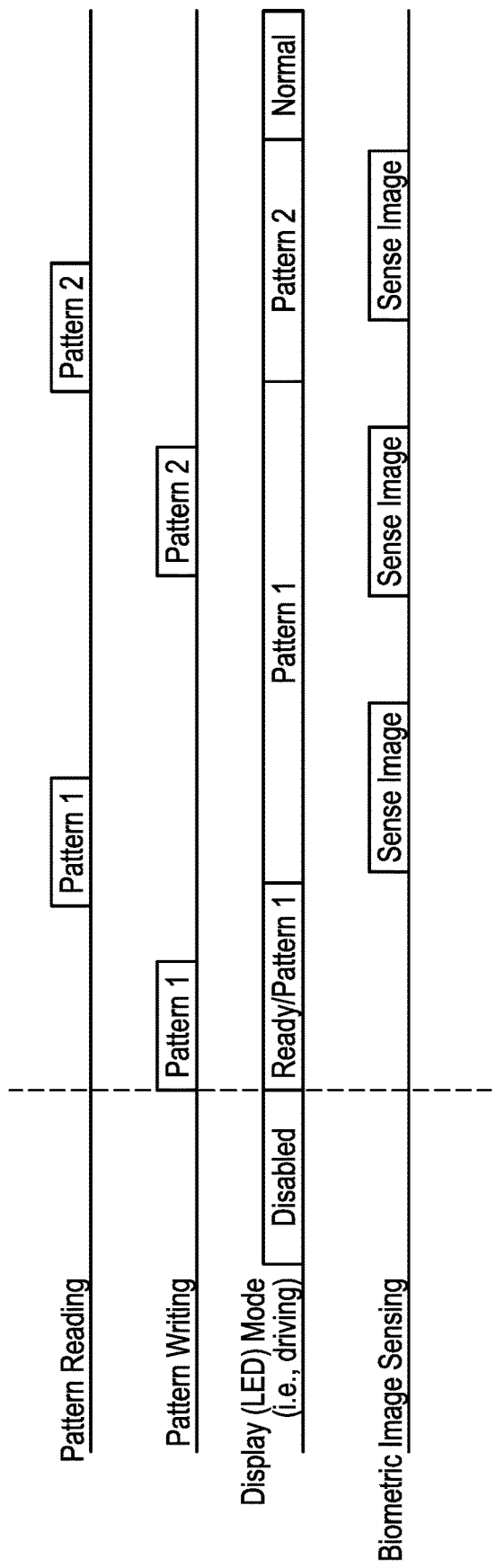
FIG. 5 is a timing diagram illustrating exemplary timing of operations in FIG. 4.

Referring now additionally to the flowchart 1050 in FIG. 4 and the timing diagram in FIG. 5, further details of operation of the display driver 1041 are now described. Beginning at Block 1052, the display processor 1044 reads a first illumination pattern from the first memory 1042 (Block 1054). Prior to the reading, the display 1023 may be disabled or in a sleep mode (FIG. 5). The first illumination pattern may be communicated to the display processor 1044 from the device processor 1022, for example, previous to starting the operations described herein and/or before, during, or overlapping with a "wake-up" operation, as will be appreciated by those skilled in the art. At Block 1056, the display processor 1044 drives the display 1023 based upon the first illumination pattern. As will be appreciated by those skilled in the art, when sensing an object, for example, a user's finger 1040, using the biometric image sensor 1031, different lighting or illumination patterns may affect the quality and type of optical image data acquired. For example, when used as a finger biometric sensor, multiple images acquired under different illumination patterns are desirable to extract features in more than two dimensions, make a spoof determination, and/or obtain enough angular information to reconstruct a three-dimensional image. Thus, by acquiring optical image data from the biometric image sensor 1031 under different lighting or illumination conditions, additional and more detailed information about the sensed object may be acquired.

The display processor 1044 drives the display so that selected ones of the display pixels or LEDs 1027 in a given area 1045 of the display 1023 are illuminated, for example, in a 160×160 pixel area. At Block 1058, the biometric image sensor 1031 acquires optical images data, for example, finger biometric data, while the display processor 1044 is driving the display 1023 with the first illumination pattern data. More particularly, the biometric image sensor 1031 may acquire one or more optical images while the display processor 1044 is driving the display based upon the first illumination pattern data.

Also while the display processor 1044 is driving the display 1023 with the first illumination pattern, the device processor 1022 is writing second illumination pattern data to the second memory 1043 (Block 1060). Similarly to the first illumination pattern data, the second illumination pattern data may be communicated to the display processor 1044 from the device processor 1022. The second illumination pattern data may be different from the first illumination pattern. At Block 1062, the display processor 1044 reads the second illumination pattern data from the second memory 1043 and, at Block 1064, drives the display 1023 based upon the second illumination pattern data. The driving of the display 1023 based upon the second illumination pattern data may occur after (i.e., sequentially) driving the display based upon the first illumination pattern data. At Block 1066, the biometric image sensor 1031 senses or acquires biometric images or optical biometric images while the display processor 1044 is driving the display based upon the second illumination pattern data.

If acquisition or sensing of further biometric images from the biometric image sensor 1031 is desired (Block 1068), further illumination pattern data is written to the first memory 1042 while driving the display based upon the second illumination pattern data (Block 1070). The further illumination pattern data, which may be received from the device processor 1022, may be the same or different from any of the previous illumination pattern data. Operation returns to Block 1062 where the illumination pattern data (i.e., further illumination pattern data) is read from the first memory 1042. It should be noted that while Blocks 1062-1066 reference second illumination pattern data, the operations are applicable to further (e.g., third, fourth, etc.) illumination pattern data. The process continues, alternatingly reading respective illumination patterns from the first and second memories 1042, 1043 to drive the display 1023 during biometric image sensing until acquisition of biometric images or image data from the biometric image sensor 1031 is no longer desirable (Block 1068). The method ends at Block 1072 and the display 1023 may be returned to normal operations, for example, to display graphics in the given area 1045.

Figure 6:
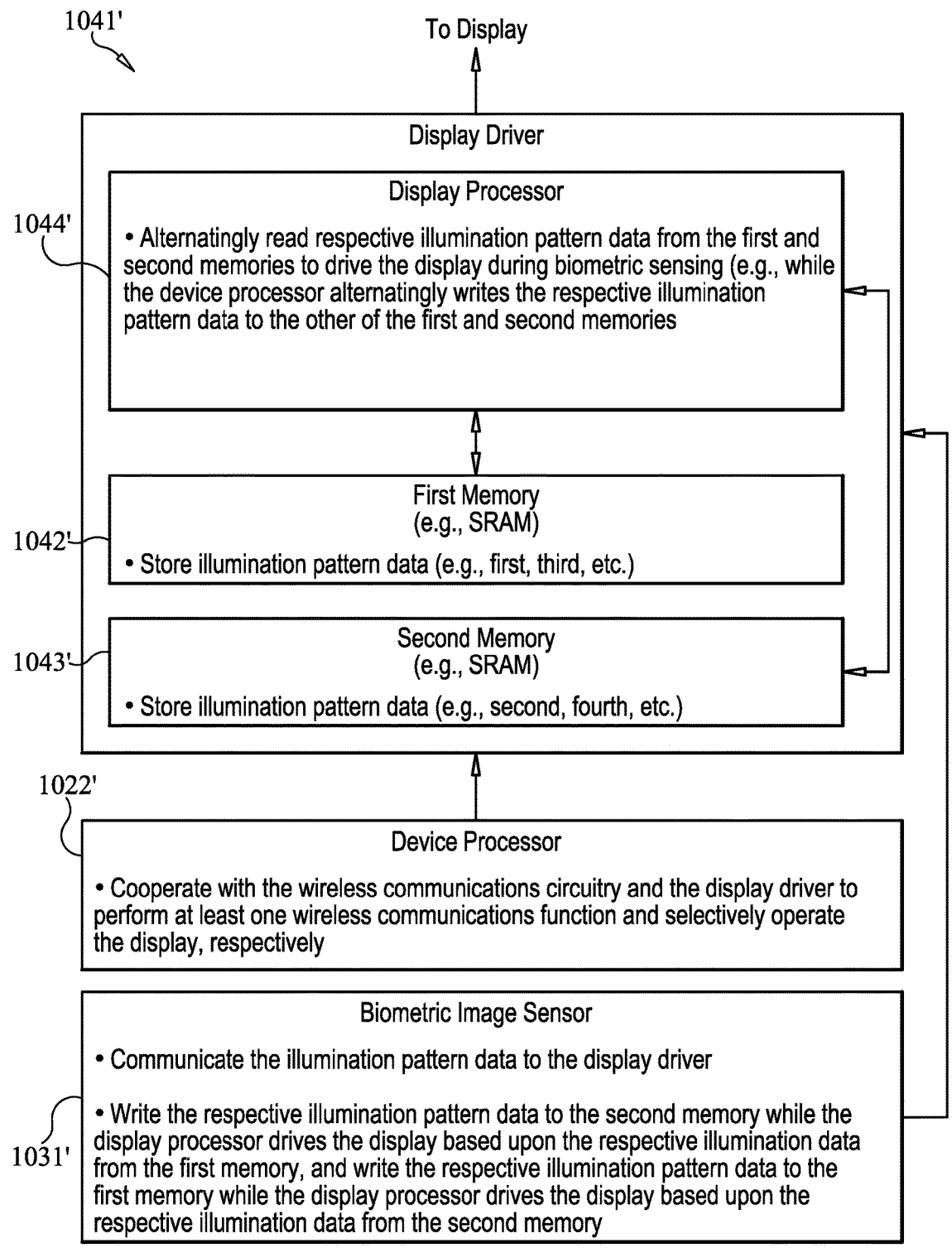
FIG. 6 is a schematic block diagram of a display driver and device processor of an electronic device according to another embodiment.

Referring briefly to FIG. 6, in another embodiment, the biometric image sensor 1031' may communicate illumination pattern data to the display driver 1041'. Accordingly, while the display processor 1044' is driving the display 1023' with the first illumination pattern, the biometric image sensor 1031' is writing second illumination pattern data to the second memory 1043'. Similarly to the first illumination pattern data, the second illumination pattern data may be communicated to the display processor 1044' from the biometric image sensor 1031'. The second illumination pattern data may be different from the first illumination pattern. The display processor 1044' reads the second illumination pattern data from the second memory 1043' and drives the display 1023' based upon the second illumination pattern data. The biometric image sensor 1031' senses or acquires biometric images or optical biometric images while the display processor 1044' is driving the display based upon the second illumination pattern data.

As will be appreciated by those skilled in the art, by alternatingly reading respective illumination pattern data from the first and second memories 1042, 1043 to drive the display 1023, writing and "pasting" speed on the display may be increased. In other words, the embodiments of the electronic device 1020 described herein may be particularly advantageous by transferring the next illumination pattern without interrupting the pasting or displaying of the current illumination pattern. The independent operation of the display 1023 relative to the device processor 1022, for example, may be particularly advantageous to address delay added during a "wake-up" operation (e.g., turning on the display, etc.). Accordingly, the first and second memories 1042, 1043 may not be used during normal operation of the display 1023 (i.e., not during biometric image sensing).

The benefits of biometric data collected by a device as disclosed herein include convenient access to device features without the use of passwords. In other examples, user biometric data is collected for providing users with feedback about their health or fitness levels. The present disclosure further contemplates other uses for personal information data, including biometric data that benefit the user of such a device.

Practicing the present invention requires that collecting, transferring, storing, or analyzing user data, including personal information, will comply with established privacy policies and practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. Personal information from users should not be shared or sold outside of legitimate and reasonable uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

The present disclosure also contemplates the selective blocking of access to, or use of, personal information data, including biometric data. Hardware and/or software elements disclosed herein can be configured to prevent or block access to such personal information data. Optionally allowing users to bypass biometric authentication steps by providing secure information such as passwords, personal identification numbers (PINS), touch gestures, or other authentication methods, alone or in combination, is well known to those of skill in the art. Users can further select to remove, disable, or restrict access to certain health-related applications collecting users' personal health or fitness data.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
   a display;
   a biometric image sensor configured for biometric image sensing;
   a display driver coupled to the display and comprising first and second memories, and
      a processor configured to alternatingly read respective illumination pattern data from the first memory to drive the display during biometric image sensing and from the second memory to drive the display also during the biometric image sensing; and
   a device processor communicating the illumination pattern data to the display driver and configured to
      write the respective illumination pattern data to the second memory while the processor drives the display based upon the respective illumination pattern data from the first memory, and
      write the respective illumination pattern data to the first memory while the processor drives the display based upon the respective illumination pattern data from the second memory.

2. The electronic device of claim 1 wherein the processor and the device processor are implemented as separate integrated circuits (ICs).

3. The electronic device of claim 1 wherein the biometric image sensor is configured to communicate the illumination pattern data to the display driver.

4. The electronic device of claim 1 wherein the display defines a finger placement surface.

5. The electronic device of claim 1 wherein the display comprises a light emitting diode (LED) display.

6. The electronic device of claim 5 wherein the LED display comprises an organic LED display.

7. The electronic device of claim 1 wherein the first and second memories each comprises a static random access memory (SRAM).

8. An electronic device comprising:
   a housing;

a biometric image sensor carried by the housing and configured for biometric image sensing;
wireless communications circuitry carried by the housing;
a display carried by the housing;
a display driver coupled to the display and comprising first and second memories, and
a display processor configured to alternatingly read respective illumination pattern data from the first memory to drive the display during biometric image sensing and from the second memory to drive the display also during the biometric image sensing; and
a device processor configured to cooperate with the wireless communications circuitry and display driver to perform at least one wireless communications function and selectively operate the display, respectively, the device processor configured to
write the respective illumination pattern data to the second memory while the display processor drives the display based upon the respective illumination pattern data from the first memory, and
write the respective illumination pattern data to the first memory while the display processor drives the display based upon the respective illumination pattern data from the second memory.

9. The electronic device of claim 8 wherein the device processor communicates the illumination pattern data to the display driver.

10. The electronic device of claim 8 wherein the display processor and the device processor are implemented on separate integrated circuits (ICs).

11. The electronic device of claim 8 wherein the display defines a finger placement surface.

12. The electronic device of claim 8 wherein the display comprises a light emitting diode (LED) display.

13. The electronic device of claim 12 wherein the LED display comprises an organic LED display.

14. The electronic device of claim 8 wherein the first and second memories each comprises static random access memory (SRAM).

15. A method of operating an electronic device comprising a display, a biometric image sensor configured for biometric image sensing, and a display driver coupled to the display, the method comprising:
using a processor of the display driver to alternatingly read respective illumination pattern data from a first memory of the display driver to drive the display during biometric image sensing and from a second memory of the display driver to drive the display also during the biometric image sensing; and
using a device processor to communicate the illumination pattern data to the display driver and to
write the respective illumination pattern data to the second memory while the processor drives the display based upon the respective illumination pattern data from the first memory, and
write the respective illumination pattern data to the first memory while the processor drives the display based upon the respective illumination pattern data from the second memory.

16. The method of claim 15 wherein the processor and the device processor are implemented on separate integrated circuits (ICs).

17. The method of claim 15 further comprising using the biometric image sensor to communicate the illumination pattern data to the display driver.

18. An electronic device comprising:
a display;
a biometric image sensor configured for biometric image sensing;
a display driver coupled to the display and comprising first and second memories, and
a processor configured to alternatingly read respective illumination pattern data from the first and second memories to drive the display during biometric image sensing; and
a device processor communicating the illumination pattern data to the display driver and configured to
write the respective illumination pattern data to the second memory while the processor drives the display based upon the respective illumination pattern data from the first memory, and
write the respective illumination pattern data to the first memory while the processor drives the display based upon the respective illumination pattern data from the second memory.

19. The electronic device of claim 18 wherein the processor and the device processor are implemented as separate integrated circuits (ICs).

20. The electronic device of claim 18 wherein the display defines a finger placement surface.

21. The electronic device of claim 18 wherein the display comprises a light emitting diode (LED) display.

22. The electronic device of claim 21 wherein the LED display comprises an organic LED display.

23. A method of operating an electronic device comprising a display, a biometric image sensor configured for biometric image sensing, and a display driver coupled to the display, the method comprising:
using a processor of the display driver to alternatingly read respective illumination pattern data from first and second memories of the display driver to drive the display during biometric image sensing; and
using a device processor to communicate the illumination pattern data to the display driver and to
write the respective illumination pattern data to the second memory while the processor drives the display based upon the respective illumination pattern data from the first memory, and
write the respective illumination pattern data to the first memory while the processor drives the display based upon the respective illumination pattern data from the second memory.

24. The method of claim 23 wherein the processor and the device processor are implemented on separate integrated circuits (ICs).

* * * * *